United States Patent [19]

New

[11] Patent Number: 4,692,888

[45] Date of Patent: Sep. 8, 1987

[54] METHOD AND APPARATUS FOR GENERATING AND SUMMING THE PRODUCTS OF PAIRS OF NUMBERS

[75] Inventor: Bernard J. New, Los Gatos, Calif.

[73] Assignee: Advanced Micro Devices, Inc., Sunnyvale, Calif.

[21] Appl. No.: 657,563

[22] Filed: Oct. 3, 1984

[51] Int. Cl.$^4$ ............................................. G06F 7/38
[52] U.S. Cl. .................................................. 364/728
[58] Field of Search ....................... 364/728, 736, 754

[56] References Cited

U.S. PATENT DOCUMENTS

| | | | |
|---|---|---|---|
| 3,500,027 | 3/1970 | Wyle | 364/728 |
| 3,840,861 | 10/1974 | Amdahl et al. | 364/736 |
| 4,215,416 | 7/1980 | Muramatsu | 364/736 |
| 4,490,807 | 12/1984 | Chevillat et al. | 364/736 |

*Primary Examiner*—David H. Malzahn
*Attorney, Agent, or Firm*—Patrick T. King; Warren M. Becker; J. Vincent Tortolano

[57] ABSTRACT

An apparatus is described for summing the products of a predetermined number of successive pairs of numbers. In the apparatus there is provided an arithmetic unit having a first and a second input and an output, a first, a second and a third register and a first and a second multiplexer. In operation, a first pair of numbers are multiplied and the product thereof stored in the third register. Thereafter, a second pair of numbers are multiplied and the product thereof stored in the second register. Thereafter, the contents of the second and third register are added and the sum thereof stored in the third register. After the sum of the products of the first and second pairs of numbers are stored in the third register, the products of succeeding pairs of numbers are stored in the second register. After each such product has been stored in the second register, it is added to the contents previously stored in the third register and the sum thereof stored in the third register until the contents of the third register comprises the sum of the products of all of the pairs of numbers applied to the apparatus.

5 Claims, 1 Drawing Figure

METHOD AND APPARATUS FOR GENERATING AND SUMMING THE PRODUCTS OF PAIRS OF NUMBERS

BACKGROUND OF THE INVENTION

1. Field of the Invention

The present invention relates to arithmetic apparatus in general and to an apparatus for providing a summation of the products of a predetermined number of successive pairs of numbers in particular.

2. Related Application

The present application is related to a copending application Ser. No. 655,482, filed by the applicant on Sept. 27, 1984, entitled Floating Point Add/Subtract and Multiplying Assemblies Sharing Common Normalization, Rounding and Exponential Apparatus, and assigned to the assignee of the present application. The relationship between this and the above application is that the fully combinatorial arithmetic apparatus used for adding and multiplying numbers which is disclosed in the above application is preferably, though not necessarily, used in a preferred embodiment of the present invention.

3. Description of Prior Art

A summation of the products of successive pairs of numbers is given by the following general mathematic expression:

$$\Sigma A_i X_i = A_0 X_0 + A_1 X_1 \ldots A_k X_k$$

where k is a predetermined integer.

In general, the above described mathematical expression is solved by successive multiplications and a summation of the resulting products.

Heretofore, methods and apparatus for providing a summation of products resulting from a plurality of successive multiplications have required separate assemblies to perform the multiplication and summing operations. For example, it has been the practice to provide a multiplier and an adder. The multiplier was provided with a pair of inputs for receiving a pair of numbers to be multiplied and an output for providing the resulting product. The adder was provided with a pair of inputs, an output and an accumulator register having an input and an output. The output of the multiplier was coupled to one of the adder inputs, the input of the register was coupled to the output of the adder and the output of the register was coupled to the other of the adder inputs.

In use, a pair of numbers to be multiplied was applied to the multiplier inputs and the resulting product appearing on the output of the multiplier was applied to one of the inputs of the adder. A second input to the adder was obtained from the output of the accumulator register. The adder then added its inputs and the sum thereof was stored in the accumulated register for use in the next addition operation.

In general, the prior known arithmetic apparatus capable of successive multiplication and addition, such as described above, required the result of the multiplication to be re-entered externally for addition or has dedicated circuit connections limiting its use to the multiplication and summing operations as distinguished from a general purpose apparatus with a wholly internal facility for performing the stated operations.

SUMMARY OF THE INVENTION

In view of the foregoing, principle objects of the present invention are a novel method and apparatus for multiplying and summing the products of a predetermined number of successive pairs of numbers.

Other objects of the present invention are a method and apparatus as described above comprising an apparatus with a wholly internal facility for multiplying and summing the products of a predetermined number of successive pairs of numbers.

In accordance with the above objects there is provided an arithmetic unit having a pair of inputs and an output for adding and multiplying two numbers, a first and a second register and a first and a second multiplexer coupled to each of said inputs, respectively, and a third register coupled to said output.

In operation, using the first and second registers and the first and second multiplexers, a pair of numbers are multiplied and the product thereof is stored in the third register. Thereafter, another pair of numbers is multiplied and stored in the second register. After the second product is stored in the second register, the products stored in the second and third registers are added and the sum thereof stored in the third register.

After the sum of the products of the first two pairs of numbers is stored in the third register, by a selective use of the first and second registers and the first and second multiplexers, a predetermined number of additional pairs of numbers are multiplied. The product of each multiplication is stored in the second register and, after each such storage, added to the contents of the third register such that, after said predetermined number of pairs of numbers have been multiplied, the third register comprises the sum of the products.

BRIEF DESCRIPTION OF THE DRAWING

The above and other objects features and advantages of the present invention will become apparent from the following detailed description of the accompanying drawing in which.

DETAILED DESCRIPTION OF THE DRAWING

Figure 1:
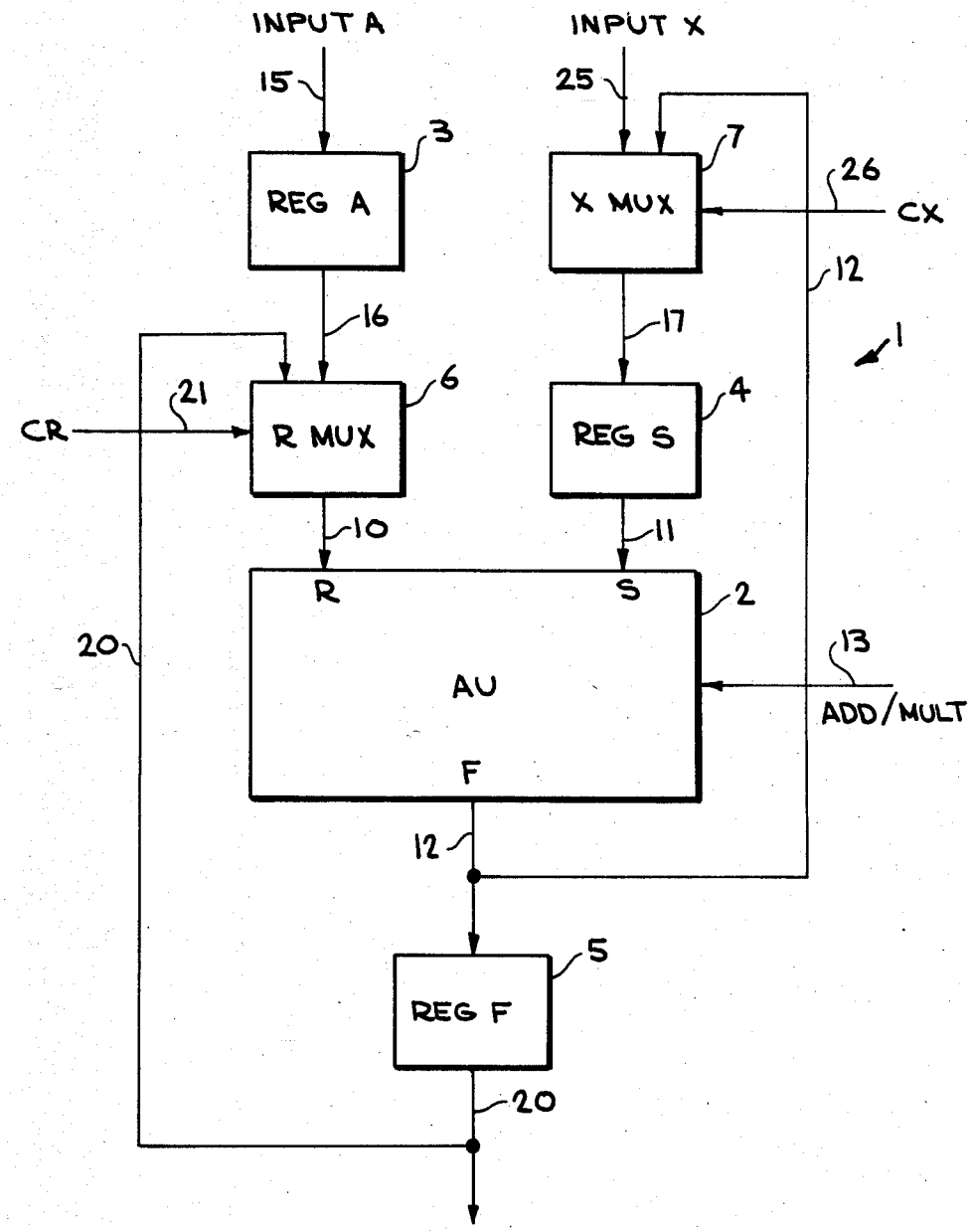
FIG. 1 is a block diagram of an embodiment of the present invention.

Referring to FIG. 1 there is provided in accordance with the present invention an arithmetic apparatus designated generally as 1. In apparatus 1 there is provided an arithmetic unit 2, a first register 3, a second register 4 and a third register 5, a first multiplexer 6 and a second multiplexer 7.

In the arithmetic unit 2 there are provided circuits for selectively adding and multiplying a pair of numbers, a first input, also designated R, coupled to an input line 10, a second input, also designated S, coupled to an input line 11, an output, also designated F, coupled to an output line 12, and a control signal input, also designated add/mult coupled to a control signal input line 13.

In the register 3, also designated REG A, there is provided an input coupled to an input line 15 for receiving a first number $A_i$ and an output coupled to an output line 16. The number $A_i$ represents one of a plurality of numbers $A_0, A_1 \ldots A_k$, where k is a predetermined integer.

In the register 4, also designated REG S, there is provided an input coupled to an input line 17 and an output coupled to the input line 11 of the arithmetic 2.

In the register 5, also designated REG F, there is provided an input coupled to the output line 12 of the arithmetic unit 2 and an output coupled to an output line 20.

In the multiplexer 6, also designated R MUX, there is provided a first input coupled to the output of the register 3 by means of the line 16, a second input coupled to the output of the register 5 by means of the line 20, an output coupled to the first input R of the arithmetic unit 2 by means of the input line 10 and a control signal input for receiving a control signal CR by means of control signal input line 21.

In the multiplexer 7 there is provided a first input coupled to an input line 25 for receiving a second number $X_i$ and a second input coupled to the output F of the arithmetic unit 2 by means of line 12, an output coupled to the input of the register 4 by means of the input line 17, and a control signal input for receiving a control signal CX on a control signal input line 26. The number $X_i$ represents one of a plurality of numbers $X_0, X_1 \ldots X_k$, where k is a predetermined integer equal to the integer associated with $A_i$ described above.

In operation, in response to a first clock pulse and a control signal CX applied to input line 26 of the multiplexer 7, a first pair of numbers $A_0$ and $X_0$ are transferred into registers 3 and 4, respectively.

In response to a second clock pulse and a control signal CR applied to the input line 21 of the multiplexer 6 and a multiply control signal MULT applied to the arithmetic unit 2 on input line 13, the contents of the registers 3 and 4 are multiplied and the product thereof transferred to register 5. At this point the register 5 contains the product of the first pair of numbers $A_0, X_0$. At the same time, that is, in response to the second clock pulse and the control signal CX applied to the multiplexer 7 but after the product of the first pair of numbers $A_0, X_0$ has been stored in the register 5, a second pair of numbers, $A_1, X_1$ is transferred to the registers 3 and 4, respectively.

In response to a third clock pulse, a control signal CX applied to multiplexer 7 on the line 26 a control signal CR applied to the multiplexer 6 on the line 21 and a control signal MULT applied to the arithmetic unit 2 on line 13, the contents of the registers 3 and 4 ($A_1, X_1$) are multiplied and the product thereof transferred to the register 4. During this time the contents ($A_0, X_0$) of the register 5 are held in register 5.

In response to a fourth clock pulse, a control signal CR on the control signal line 21 coupled to the multiplexer 6 and a control signal ADD on the control line 13 coupled to the arithmetic unit 2, the contents of the registers 4 and 5 are added and the sum thereof stored in the register 5. At this time, the register 5 comprises the sum of the products of the first two pairs of numbers ($A_0, X_0 + A_1, X_1$) applied to the input lines 15 and 25. Thereafter, and in response to a control signal CX applied to the control signal line 26 coupled to the multiplexer 7, a third pair of numbers $A_2, X_2$ are transferred into the registers 3 and 4.

After the third pair of numbers $A_2, X_2$ are transferred into the registers 3 and 4, the operations performed in response to the third and fourth clock pulses as described above are repeated until register 5 comprises the sum of the products of all of the pairs of numbers $A_i, X_i$ applied to the input lines 15 and 25.

In a preferred embodiment of the present invention, the arithmetic unit 2 is a fully combinatorial arithmetic unit such as described in applicant's copending application entitled Floating Point Add/Subtract And Multiplying Assemblies Sharing Common Normalization, Rounding And Exponential Apparatus, filed Sept. 27, 1984. However, it is contemplated that any suitable arithmetic unit capable of performing addition and multiplication and having a first and a second input and an output and a control signal input responsive to an add and a multiply control signal for selectively adding and multiplying numbers applied to its inputs may be used.

While a preferred embodiment and a suggested alternative embodiment of the present invention are described above, it is contemplated that various modifications may be made thereto without departing from the spirit and scope of the present invention. Accordingly, it is intended that the above described embodiments of the invention be considered only as illustrative of the invention and that the scope of the invention be determined by reference to the claims hereinafter provided.

What is claimed is:

1. A method of generating and summing the products of a predetermined number of successive pairs of numbers comprising the steps of:
  (a) transferring a first pair of said numbers to a first and a second register, respectively;
  (b) multiplying the contents of said first and said second registers and storing the product thereof in a third register; thereafter
  (c) transferring another pair of numbers to said first and said second registers, respectively; thereafter
  (d) multiplying the contents of said first and said second registers and storing the product thereof in said second register; thereafter
  (e) adding the contents of said third register and said second register and storing the sum thereof in said third register; thereafter
  (f) repeating steps (c)-(e) for each remaining pair of said predetermined number of successive pairs of numbers until the contents of said third register comprises the sum of the products of all of said pairs of numbers.

2. An apparatus for generating and summing the products of a predetermined number of successive pairs of numbers comprising:
  (a) a first, a second and a third register;
  (b) means for selectively adding or multiplying two numbers;
  (c) means for transferring a first one of said successive pairs of said numbers to said first and said second register, respectively;
  (d) means for transferring the contents of said first and said second registers to said adding and multiplying means after said first one of said successive pairs of numbers has been transferred to said first and said second registers and storing the product thereof in said third register;
  (e) means for transferring the contents of said first and said second registers to said adding and multiplying means after each succeeding pair of said successive pairs of numbers has been transferred to said first and said second registers and storing the product thereof in said second register; and
  (f) means for transferring the contents of said third register and said second register to said adding and multiplying means after the product of each succeeding pair of said successive pairs of numbers has been stored in said second register and storing the sum thereof in said third register until the contents of said third register comprises the sum of the products of all of said successive pairs of numbers.

3. An apparatus according to claim 2 comprising:
a first multiplexer responsive to a control signal for selectively transferring the contents of said first register or said third register to said adding and multiplying means; and
a second multiplexer responsive to a control signal for selectively transferring a number from said second source of numbers or the output of said adding and multiplying means to said second register.

4. An apparatus according to claim 2 wherein said adding and multiplying means comprises fully combinatorial adding and multiplying means.

5. An apparatus for providing a summation of the products resulting from a multiplication of a number from a first source of numbers and a number from a second source of numbers comprising:
a first, second and third register;
a first and a second multiplexer;
means responsive to a control signal for selectively adding or multiplying a pair of numbers;
means for coupling an input of said first register to said first source of numbers;
means for coupling an output of said first register to a first input of said first multiplexer;
means for coupling an output of said first multiplexer to a first input of said adding and multiplying means;
means for coupling an output of said adding and multiplying means to an input of said third register;
means for coupling an output of said third register to a second input of said first multiplexer, said first multiplexer comprising means responsive to a control signal for selectively transferring the contents of said first or said third registers to said first input of said adding and multiplying means;
means for coupling a first input of said second multiplexer to said second source of numbers;
means for coupling an output of said second multiplexer to an input of said second register;
means for coupling an output of said second register to a second input of said adding and multiplying means;
means for coupling said output of said adding and multiplying means to a second input of said second multiplexer, said second multiplexer comprising means responsive to a control signal for selectively transferring a number from said second source of numbers or said output of said adding and multiplying means to said second register; and
means for providing said output of said third register to an external apparatus.

* * * * *